United States Patent [19]

Zeh

[11] Patent Number: 4,948,519

[45] Date of Patent: Aug. 14, 1990

[54] METHOD OF REMOVING SEDIMENTATED SOLIDS FROM A CONTAINER AND AN APPARATUS THEREFOR

[75] Inventor: Horst Zeh, Karlsruhe, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 422,115

[22] Filed: Oct. 16, 1989

[30] Foreign Application Priority Data

Oct. 15, 1988 [DE] Fed. Rep. of Germany ....... 3835272

[51] Int. Cl.[5] .............................................. B01D 21/02

[52] U.S. Cl. .................................... 210/803; 210/207; 210/519; 220/5 A

[58] Field of Search ........................ 210/207, 519, 803; 220/5 A

[56] References Cited

U.S. PATENT DOCUMENTS 3,627,136 12/1971 Brno et al. .......................... 210/519

4,844,276 8/1988 Kunze ................................ 220/5 A

*Primary Examiner*—Bernard Nozick

*Attorney, Agent, or Firm*—Walter Ottesen

[57] ABSTRACT

The invention is directed to a method of removing solids from a container. The method is for discharging sedimentated solids from a container which is inclined in the direction toward its outlet. The method is technically simple and prevents or minimizes the amount of secondary waste or the use of flushing liquid. This result is achieved by subjecting the residual liquid in the container to the action of pulsed compressed air which passes through a perforated pipe extending parallelly to the bottom of the container. A container apparatus for carrying out the method is also disclosed.

6 Claims, 1 Drawing Sheet

Fig. 1
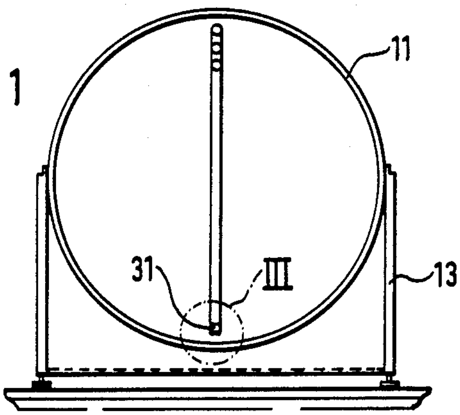
Fig. 2
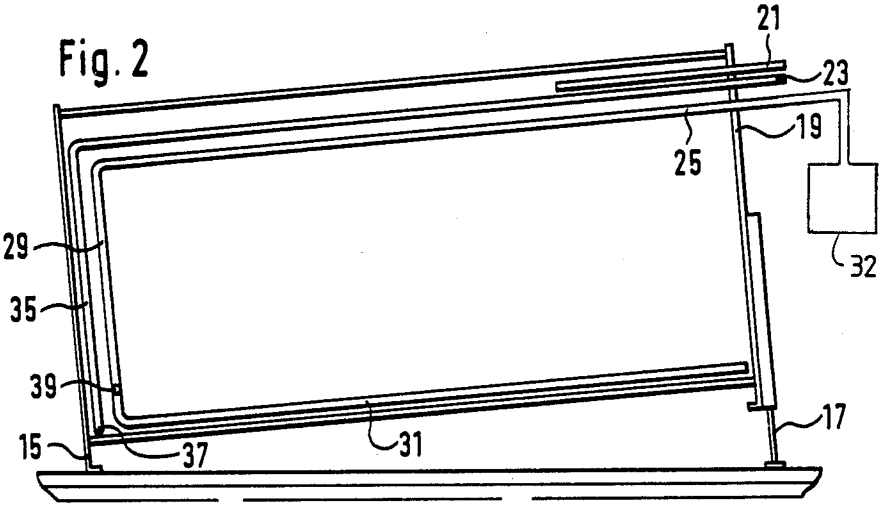
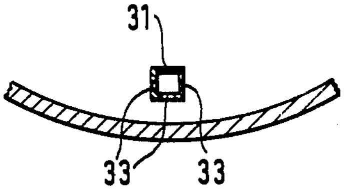
Fig. 3
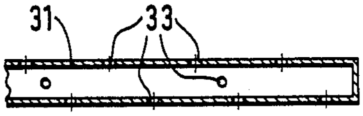
Fig. 4

METHOD OF REMOVING SEDIMENTATED SOLIDS FROM A CONTAINER AND AN APPARATUS THEREFOR

FIELD OF THE INVENTION

The invention relates to a method for removing sedimentated solids from a container inclined in the direction of the outlet of the container. A container apparatus for carrying out the method is also disclosed.

BACKGROUND OF THE INVENTION

When containers holding liquids with a high proportion of solids content are emptied, a difficulty which arises is that sedimentated solids are left behind after emptying is completed. These sedimentated solids can only be removed with considerable effort. However, and particularly in the case of containers which hold radioactive liquids, it is necessary to move the deposits to the outlet opening to reliably avoid an accumulation of solids on the bottom of the container.

In nuclear reprocessing facilities, it is intended to install circular horizontal containers that lie horizontally and have bottoms which are either set at a slight inclination towards the discharge pipe or which are capable of being inclined during the emptying process. It has been proposed that flushing means be disposed close to the bottom or close to the inside walls of the containers by which deposits of solids can be flushed out and conveyed to an outlet pipe by a secondary liquid, for example, water. It is unsatisfactory in this respect to require large quantities of flushing water for large containers. These large quantities of flushing water which are needed after a container has been emptied do, in the case of radioactive product solutions, lead to an undesired increase in secondary waste, the disposal of which is very cost intensive.

Another disadvantage is that the useful materials in the radioactive product solution are highly diluted by the flushing liquid and this adversely affects the economic processing of the product solution.

SUMMARY OF THE INVENTION

It is an object of the invention to provide a method of removing sedimentated solids from containers. It is another object of the invention to provide such a method which is technically simple in its operation and prevents or minimizes the amount of secondary waste or the use of flushing liquid.

The method of the invention is for removing sedimentated solids from a container having an outlet opening and holding a liquid suspension of the solids. The method includes the steps of: inclining the container so as to cause the container to be inclined toward the outlet thereof and permit the liquid to flow to the outlet and from the container; and, charging the residual liquid remaining in the container with pulsating compressed gas through a perforated pipe extending substantially parallelly to the bottom of the container thereby causing the sedimentated solids to break up and be carried away with the residual liquid.

A pulsating compressed gas such as air is applied to the perforated pipe. In the pause between pulsations, part of the residual liquid from the container enters the pipe and is sprayed out therefrom through the perforations in response to the next pressure pulse. The liquid sprayed out in this manner is in the form of radial jets of liquid spray. In the region of the portion of the pipe which has emerged from below the liquid, the sedimentated solids are washed off the container wall and moved in the direction of the outlet pipe. Essential to the formation of the jets of liquid spray is that the spray pipe have one side which emerges from below the liquid because of the emptying of the container and as the result of the inclination of the container bottom.

If the spray pipe still lies with all its nozzle-like openings submerged in the liquid, the compressed air pulsation will provide an additional turbulence. But only when, as the container becomes emptier, the spray pipe partly emerges out from below the liquid, will the washing effect be achieved in that area of the container at which the spray pipe has emerged.

The liquid laden with solids material passes into the perforated spray pipe through the bores therein. The return flow of the liquid during the pause between pulsations is effected by the liquid pressure which is present. The liquid which has entered is forced out of the exposed portion of the pipe by each intermittent pulse of compressed air.

According to another feature of the invention, an underpressure can be applied to the perforated pipe for obtaining a backflow. This is then in addition to the step of charging the residual liquid remaining in the container with pulsed compressed air. By using the backflow, the liquid is drawn into the spray pipe by the suction developed by this backflow. The backflow of the liquid is accelerated by the application of an underpressure. Furthermore, the application of this underpressure can increase the quantity of liquid per stroke.

The invention also relates to a container apparatus which includes a container for holding suspensions containing solids and especially radioactive liquids. The container or the bottom thereof is inclined toward an outlet opening or an outlet pipe. The apparatus includes spray means for washing off deposits of solids when the container is emptied. The container apparatus of the invention is adapted to carry out the method of the invention described above.

The spray means includes a perforated pipe parallel to the inclined bottom wall portion of the container. The perforated spray pipe is connected to a compressed air source from which it is subjected to the action of pulses of compressed air.

The liquid enters the perforated pipe during the pause between pressure pulses and flows out again as jets of liquid from those bores of the perforated pipe which are not submerged in response to a next pulse of air. These jets of liquid wash off those solids which are no longer covered by liquid and flushes them toward the outlet means.

The container defines a longitudinal axis extending through the center region thereof and parallelly to the bottom wall portion of the container. According to a feature of the invention, the perforated pipe is disposed away from the center region and close to the bottom wall portion. The perforated pipe has a plurality of radial bores formed therein and is disposed so as to direct the jets of liquid spray downwardly and laterally from the perforated pipe.

Thus, the perforated spray pipe extends close to the inside wall of the container bottom and because of the slope, more and more of the spray pipe constantly emerges from below the liquid during the course of emptying. From the highest point onwards, more and more nozzle-like openings are exposed from which jets of liquid spray are released to effect a washing action on the sedimentated solids.

According to another feature of the invention, the perforated pipe has a cross section defining a right-angled parallelogram and has a base wall. A portion of the bores in the perforated pipe are lateral bores formed therein at the elevation of the base wall. This cross-sectional configuration permits a targeted orientation of the jets of liquid. Solids carried into the perforated pipe are therefore again discharged therefrom.

The perforated pipe includes a first segment which extends parallelly to the bottom wall portion and has a plurality of openings formed therein; and, a second segment which extends into the first segment for conducting the pulsed compressed gas to the openings to form the jets of liquid spray. The second segment has an additional opening formed therein of larger cross section than the openings of the plurality of openings in the first segment and this additional opening is adapted for connecting a level measuring device for measuring the level of the contents of the container via the air-bubble method. This combination of the first segment defining the spray pipe and the second segment adapted for measuring the contents in the container permits the one pipe to be used for both processes. This combination reduces the number of openings which have to be made in the container wall. The level of the liquid in the container is not measured during the spraying operation.

The invention affords the essential advantage that when emptying large containers which hold solids-containing suspensions, the solids which become sedimentated upon emptying can be reliably discharged without using additional flushing liquid. Dilution of the product solution is likewise prevented and the proliferation of radioactive waste solutions is limited.

BRIEF DESCRIPTION OF THE DRAWINGS

The invention will now be described with reference to the drawings wherein:

FIG. 1 is a front elevation view of a container to be emptied and which is set in a frame;

FIG. 2 is a side elevation view of the container of FIG. 1 disposed in an inclined position in the frame;

FIG. 3 is an expanded view of the detail of FIG. 1 identified therein by the circle III; and, FIG. 4 shows the end portion of the spray pipe which includes a schematic representation of the radial jet openings formed in this pipe.

DESCRIPTION OF THE PREFERRED EMBODIMENTS OF THE INVENTION

A container 11 for receiving liquids containing solids has a circular cross section and lies horizontally while storing the liquid. The container 11 is provided with a fixed frame 13 having stationary feet 15 at one end while at the other end, the container has feet 17 which can be pushed downwardly out of the frame 13. These downwardly extendible feet 17 enable the container 11 to be inclined as shown in FIG. 2. The container 11 is shown in FIG. 2 as being inclined at 5°.

Three pipes 21, 23, 25 pass through one end wall 19 of the container 11. The upper pipe 21 is a waste air line to a container exhaust system not shown. The middle pipe 23 is the fill and discharge pipe through which a negative pressure is applied for discharging. The pipe 25 is an air supply line and is closed as it passes through the upper portion and up to the end portion of the container 11. From there, the air supply pipe 25 leads via a downwardly angled portion 29 of pipe to a segment which constitutes a spray pipe 31 disposed just above the bottom of the container. The spray pipe 31 extends up to the end wall 19 of the container 11 and is parallel to the container bottom.

The cross section of the spray pipe 31 defines a square as shown in FIG. 3. The spray pipe 31 is arranged to be close to but above the very lowest point of the container interior and extends parallelly to the container bottom.

FIG. 3 shows that the spray pipe 31 has downwardly and laterally directed openings 33 which function as nozzles. The lateral nozzle-like openings 33 are disposed in the bottom area. These nozzles 33 are distributed over the entire spray pipe 31 in the manner shown in FIG. 4.

The discharge pipe 23 likewise extends parallelly in the upper region of the container 11 up to the end of the container 11 where it is provided with a vertical intake stub 35 which has at its end an intake opening 37 which projects into the very lowest point of the container interior.

An opening 39 is provided in the portion 29 for the emergence of air for measuring the level of the contents by the air bubble method. The opening 39 has a larger cross section than the nozzle-like openings 33.

The operation of the apparatus described above is explained below.

If it is desired to empty the container 11 which holds the solids-containing liquid, the container 11 is moved to an inclined position by extending the feet 17. The bottom of the container 11 and thus the parallel spray pipe 31 extend at an angle of approximately 5°. The liquid is drawn off through the discharge pipe 23. By reason of the slope of the container bottom, the liquid flows to the intake opening 37 located at the very lowest point of the interior.

If the spray pipe 31 still has all its nozzle-like openings 33 in the liquid, the pulsed compressed air produces an additional turbulence in the liquid which leads to a loosening up of the sedimentated solids. Upon further discharge of the container, part of the spray pipe will emerge from the liquid. The washing effect is achieved in the exposed area which becomes ever larger as emptying proceeds. Stated otherwise, more and more of the spray pipe emerges from below the liquid surface as the container empties so that the region of the container corresponding to the emerged portion of the spray pipe is subjected to the washing action of jets of liquid leaving the nozzle-like openings 33.

The spray pipe 31 continues to emerge from the liquid toward the end of the discharge process. Pulsed compressed air is applied to the spray pipe 31 by a compressed air supply 32. In response to the pulses of compressed air, jets of liquid are sprayed from the exposed nozzle-like openings 33 onto the inside wall of the container and the sedimentated solids are washed off the container wall and passed in the direction of the discharge pipe 35.

The more the liquid is emptied from the container 11, the greater is the exposed part of the spray pipe 31 so that the area which is washed down along the axis of the container will also be larger.

It is understood that the foregoing description is that of the preferred embodiments of the invention and that various changes and modifications may be made thereto without departing from the spirit and scope of the invention as defined in the appended claims.

What is claimed is:

1. A method of removing sedimentated solids from a container having an outlet opening and holding a liquid suspension of the solids, the method comprising the steps of:

inclining the container so as to cause the container to be inclined toward said outlet thereof and permit the liquid to flow to said outlet and from said container; and, charging the residual liquid remaining in the container with pulsating compressed gas through a perforated pipe extending substantially parallelly to the bottom of the container thereby causing the sedimentated solids to break up and be carried away with the residual liquid.

2. The method of claim 1, comprising the further step of applying an underpressure to said perforated pipe after charging the latter with a pulse of compressed gas whereby a backflow of a portion of the residual liquid in the container is obtained.

3. A container apparatus for receiving a liquid suspension containing solids such as a radioactive liquid, the container apparatus comprising:

a container for accommodating the liquid suspension therein and having a bottom wall portion;

outlet means in said container for conducting the liquid suspension out of said container when emptying said container;

inclination means for positioning said bottom wall portion thereof to be inclined toward said outlet means;

spray means for removing solids of the suspension which have sedimentated on the inner wall surface of said container while the container is emptied;

said spray means including a perforated pipe extending substantially parallelly to said bottom wall portion; and, compressed gas supply means connected to said perforated pipe for charging said perforated pipe with pulsed compressed gas to cause liquid in said perforated pipe to be ejected therefrom as jets of liquid spray for breaking up the sedimentated solids.

4. The container apparatus of claim 3, said perforated pipe including a first segment extending parallelly to said bottom wall portion and having a plurality of nozzle openings formed therein; and, a second segment extending into said first segment for conducting the pulsed compressed gas to said openings to form said jets of liquid spray; said second segment having an additional opening formed therein having a larger cross section than the openings of said plurality of openings; and, said additional opening being adapted for connecting a level measuring device for measuring the level of the contents of said container via the air-bubble method.

5. The container apparatus of claim 3, said container defining a longitudinal axis extending through said center region thereof parallelly to said bottom wall portion; said perforated pipe being disposed away from said center region and close to said bottom wall portion; and, said perforated pipe having a plurality of radial bores formed therein disposed so as to direct said jets of liquid spray downwardly and laterally from said perforated pipe.

6. The container apparatus of claim 5, said perforated pipe having a cross section defining a right-angled parallelogram and having a base wall; and, a portion of said bores being lateral bores formed in said perforated pipe at the elevation of said base wall.

* * * * *